(No Model.) 2 Sheets—Sheet 1.
L. GAULARD & J. D. GIBBS.
APPARATUS FOR THE PRODUCTION AND UTILIZATION OF SECONDARY ELECTRIC CURRENTS.
No. 297,924. Patented Apr. 29, 1884.
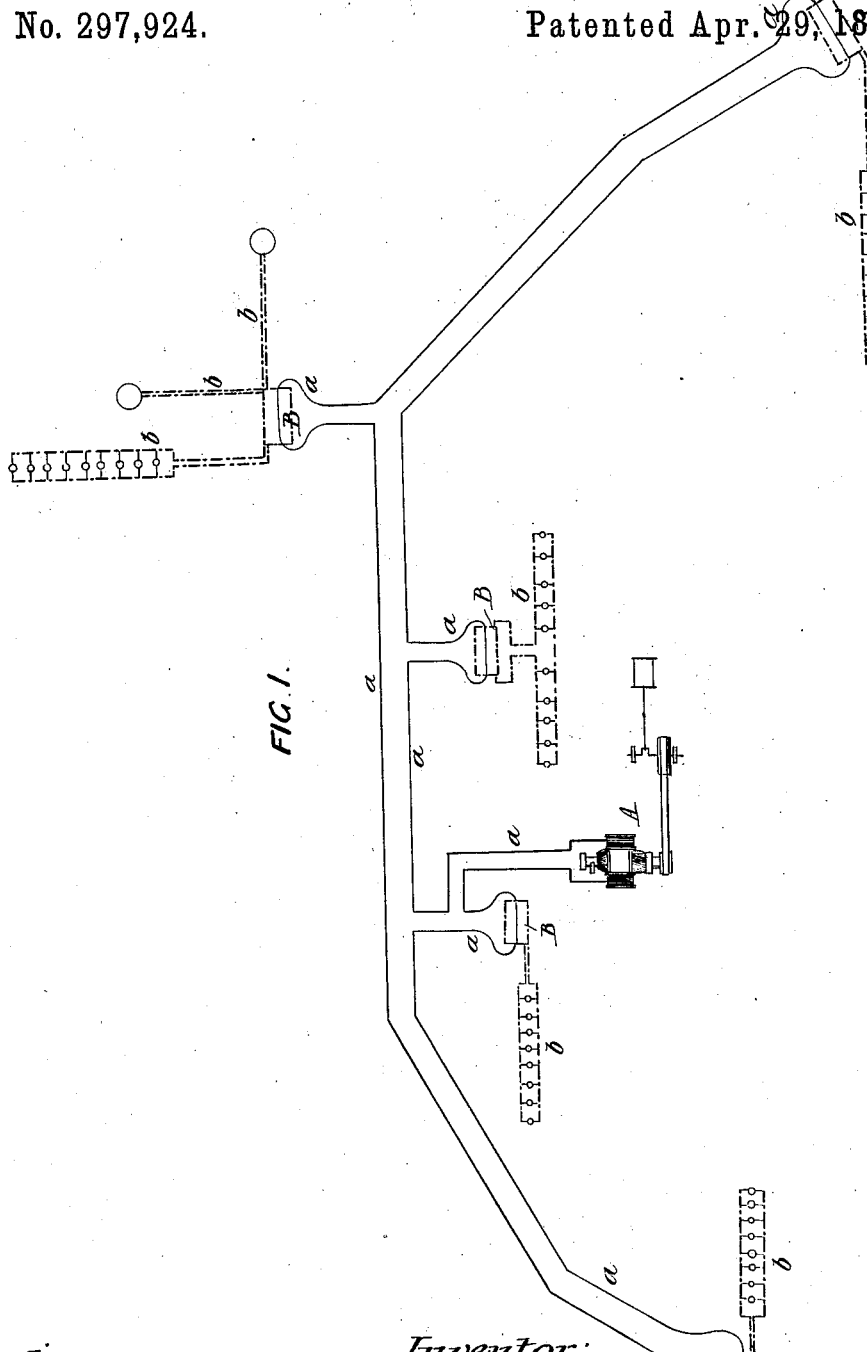
FIG. I.
Witnesses:
Philip Mauro
C. J. Hedrick
Inventor:
Lucien Gaulard
& John Dixon Gibbs by
A Pollok their atty.

(No Model.) 2 Sheets—Sheet 2.
L. GAULARD & J. D. GIBBS.
APPARATUS FOR THE PRODUCTION AND UTILIZATION OF SECONDARY ELECTRIC CURRENTS.
No. 297,924. Patented Apr. 29, 1884.
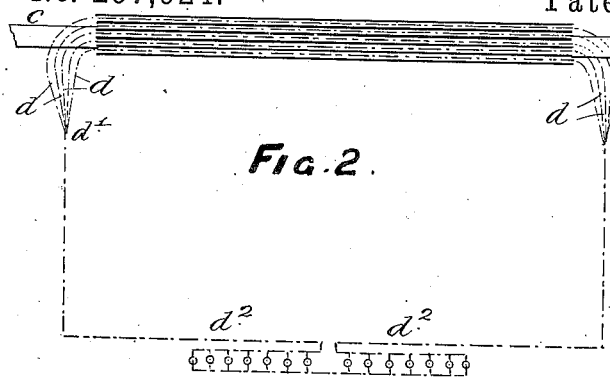
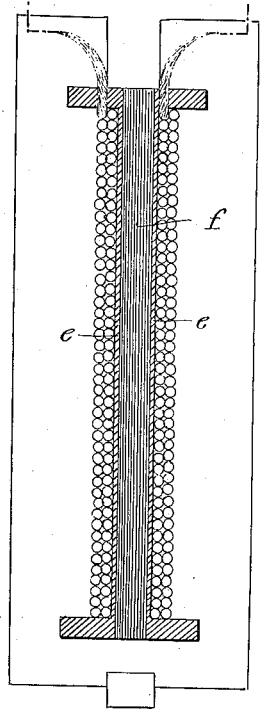
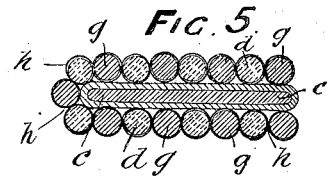
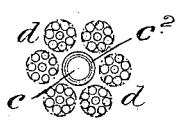
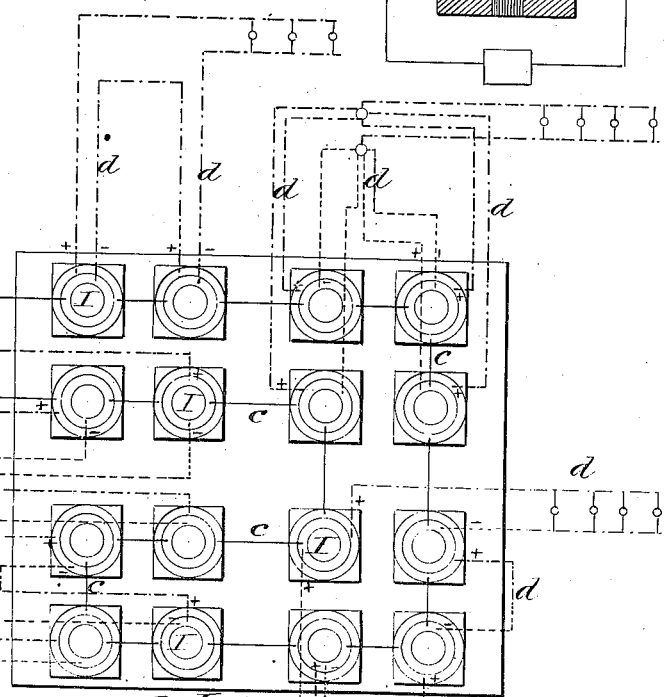

UNITED STATES PATENT OFFICE.

LUCIEN GAULARD AND JOHN DIXON GIBBS, OF 18 WARWICK STREET, REGENT STREET, COUNTY OF MIDDLESEX, ENGLAND.

APPARATUS FOR THE PRODUCTION AND UTILIZATION OF SECONDARY ELECTRIC CURRENTS.

SPECIFICATION forming part of Letters Patent No. 297,924, dated April 29, 1884.

Application filed March 4, 1884. (No model.) Patented in England February 6, 1884, No. 2,858.

*To all whom it may concern:*

Be it known that we, LUCIEN GAULARD and JOHN DIXON GIBBS, both subjects of the Queen of Great Britain and Ireland, and both residing at 18 Warwick Street, Regent Street, in the county of Middlesex, England, have invented certain Improvements in Means for Producing and Utilizing Electric Currents in Secondary Circuits, (for which we have obtained a patent in Great Britain, No. 2,858, dated February 6, 1884,) of which the following is a specification.

This invention relates to a system of generating and distributing electric energy by means of specially-constructed induction-coils; and the said invention has for its object to produce induced electrical currents in an economical and practical manner, (by means of devices hereinafter described,) for electric lighting or other purpose.

It consists of improvements in producing induced currents from a primary inducing-current, whereby the said induced current can be distributed or subdivided, as desired, without incurring loss by short-circuiting the electrical generator, as is generally the case in all known systems.

Heretofore experimenters in the utilizing of electricity by means of induction-coils have used the "Ruhmkorff coil;" but the secondary currents produced by it could not be usefully applied. Secondary currents have also been produced by passing alternating currents through a primary circuit coiled over a part of an iron core, thus magnetizing the iron core in alternating directions, and thus indirectly inducing currents in the circuits, surmounting other parts of the core by the alternations of magnetization in the core. We have discovered that in order to produce practical results it is necessary to keep the quantity or intensity and the vibrations of the current in the primary circuit constant, and to make the variations in the electrical energy required to produce the desired result by varying the tension of the current at its source. It has been contended, on the one hand, that the greater the number of interruptions in a primary current the greater the increase in the electro-motive force which acts in the secondary circuit, and consequently the greater the increase in the tension of the secondary currents obtained; and, on the other hand, that the opposite phenomenon is produced. The numerous experiments we have made enable us to explain this difference of opinion. We have found that in the case of infrequent interruptions we could charge a condenser with a certain quantity of electricity, which increased when the interruption increased, the intensity of the primary current circulating in the inductor causing an apparent increase of resistance, due to counter electro-motive force, if the secondary current were doing the minimum work. We say "apparent," for if the secondary circuit were doing its maximum work in a given time, a lesser counter electro-motive force would be induced. This leads us to conclude that the more rapid the interruption the greater the tension of the secondary current. We say, then, that in direct induction, as hereinafter set forth, the tension of the secondary current increases, first, with the intensity or quantity of the primary current; and, secondly, with the rapidity of the interruptions or alternations or the variations of potential of the primary current. As to the phenomenon of induction itself, it is produced under our system by direct induction—that is to say, the work done is maintained constant on account of the presence in the primary circuit of sufficient electro-motive force to overcome the counter electro-motive force produced by the induced currents.

We will now describe, with reference to the accompanying diagrams, a method by which our invention can be applied.

Figure 1 is a diagram illustrating the system for distributing electric energy; Fig. 2, a diagram illustrating more in detail the connection, by means of an induction-coil, of one of the secondary or consumption circuits through the induction-coil with the primary or generating circuit. Fig. 3 is an end view of a cable, which may be used in forming the induction-coils; Fig. 4, a central longitudinal section of an induction-coil; Fig. 5, a cross-section of a second and preferred form of cable for forming the induction-coils, and Fig. 6 a diagram illustrating how a number of induction-coils may be employed to connect the primary and secondary circuits with each other.

We provide a generator of electricity, (indicated at A,) so constructed and operated that the intensity or quantity of its currents is preserved constant, and the tension is varied to carry this current through the primary conductor $a$ against the varying counter electro-motive force, due to variations in the work done in the secondary circuits $b$ of a number of induction-coils, B, after the following formula and deductions, premising that W indicates work, C current, E electro-motive force, and R resistance. $W = CE = C^2R = \frac{E^2}{R}$. If either of these factors be changed, the others must be altered in the same ratio, if uniform effects in the secondary circuits in use be desired.

If a secondary circuit be closed, in a system comprising one primary and two or more secondaries, a counter electro-motive force acting on the primary would at once lower the current, and the work performed in all the closed secondaries, if additional equivalent electro-motive force be not furnished at the same time at the source of the primary current, so that under the new conditions, $W = C(E+e,)$ and work expended on the closed secondary $C(E+e) - C^2R$. Thus, having established a given current through the resistance of the primary, the work expended in keeping it is expressed by $C^2R$. Then for any number $n$ of secondaries which may be closed, the electro-motive force necessary to keep the given current is expressed by $E+ne$, and the work expended on the secondaries by $C(E+ne) - C^2R$; the total work being $C(E+ne.)$ It is known that in starting and stopping a current in the coils surrounding an electro-magnet, or in those of a helix, the neighboring convolutions exert a counter force upon one another, and that the work necessary to overcome this counter force is lost, so far as useful results are concerned. With currents that are continually alternating this loss is a very serious one, and detracts very materially from the efficiency of the system, because the inductive action which should be expended on the secondary circuit is exerted, in a great measure, locally on the primary itself. With magneto-inductive apparatus this loss is increased, because the translation of the inductive action is almost entirely through the medium of magnetism. In this case the inductive action which is exerted by a primary on a secondary surrounding the primary is lost. In order to avoid this loss, we provide an induction apparatus (illustrated by the diagram, Fig. 2) constructed with a primary conductor, $c$, forming part of an inducing electrical circuit, around which are laid insulated conductors $d\ d$, forming part of an induced circuit parallel to the primary or central conductor, $c$, and these several conductors $d$ of the induced circuit are connected at their terminals (as indicated at $d'$) in multiple arc with a single wire, $d^2$, forming part of an electric circuit for light or other purposes.

In order to obtain the most economical results, certain proportions must be observed, according to established electrical laws of resistance and of dynamic and static induction. For example, a cable may be formed of a central copper core, (see $c$, Fig. 3,) 4 millimeters in diameter, and fifty meters long, insulated by means of a double coating, $c^2$, of paraffined cotton, and of six cables, $d$, laid parallel to its axis, each composed of eight wires about half a millimeter in diameter, similarly insulated, by means of two coatings of paraffined cotton. The central core constitutes the inductor, on which circulates the primary current, and the exterior wires the secondary circuit, on which are developed the secondary currents to be utilized at different points on the distributing-circuits. A cable thus formed may be rolled on a cylinder, $b$, of card-board or other suitable material (as shown in Fig. 4) of about five centimeters diameter, in two layers. A bundle of iron wires, $f$, may be placed in the center of the cylinder, enabling, by means of magnetic surexcitation upon the introduction or withdrawal of a cylindrical copper envelope, the graduation of the intensity of the current developed in the secondary wires. The result of this novel system of induction is that, by separating from one another the spirals of the inductor, and surrounding it with a secondary circuit, the reaction of the induction of the spirals of the primary circuit on one another is wholly, or in great part, avoided. A considerable resistance, due to counter electro-motive force on the primary current, is neutralized, thus preventing the transformation into heat of a great part of the transmitted energy; or the induction coil may be made up (as shown in Fig. 5) of a number of very fine wires, $d$, laid parallel, and with an insulating strip or thread, $g$, between each, they being all connected together by a weft or lacing, $h$, of silk or other insulating material, thus constituting a ribbon, which is laid on and firmly secured to an insulating-conductor, $c$, for the primary current, which may be in the form of a flat ribbon parallel with the secondary wires, which are placed on both sides thereof. Preferably, the wires $d$, separating-strips $g$, and lacing $h$, are woven together like the threads of ordinary cloth, the wires $d$ and strips $g$ being arranged as the warp, and the lacing $h$ taking the place of the woof or weft.

The induction-coils or secondary generators may be arranged for operation as follows, and as indicated by the diagram, Fig. 6. A number of induction-coils, I, preferably arranged in groups of four columns, and made with cables, as hereinbefore described, are placed near to one another. The primaries of all the induction-coils are connected together in series, being included in the circuit $c$ with the dynamo or primary generator. The secondaries of as many coils as may be desired are connected in a consumption-circuit which includes the translating devices. As shown in this and other figures, these translating devices are arranged in multiple arc. The connection of the secondaries may be in series, in multiple arc, or in multiple series, as may be desired. The secondaries of the two coils at the upper left-hand corner of the figure are shown connected in series. The secondaries of the group at the upper right-hand corner are connected in multiple arc. Those of the lower right-hand group are connected in series. The two lower coils of the upper left-hand are connected with each other in multiple arc, and in series with the secondaries of the lower left-hand group of induction-coils. For readily altering the connections, a switch or switchboard of ordinary construction may be used. Those skilled in the art will have no difficulty in making and using a suitable switch or switch-board. Tension or quantity is thus obtained according to the nature of the current required. It is evident that a system is thus organized by which consumers can obtain from a single primary circuit electrical currents of different quality or value.

The secondary generators may be placed consecutively on the same circuit, which circuit is metallically closed with the dynamo-machine, thereby avoiding the danger of short-circuiting through the secondary circuit, whatever the electro-motive force acting in the primary conductor may be, because the conductivity of the conductor of a line of even several miles in length does not offer any difficulty or danger when our inductive system of high electro-motive force is used.

We claim—

1. In apparatus for producing secondary currents, the combination, with a single primary, of a set of insulated secondary conductors laid parallel thereto and connected in multiple arc, substantially as described.

2. In a system for distributing electricity by means of induction-coils, the combination, with the main or generating circuit including the primaries of the induction-coils in series, of the consumption-circuits including translating devices and the secondaries of said coils, each secondary comprising a set of insulated conductors laid parallel to the primary conductor, and connected in multiple arc, substantially as described.

3. In a system for inducing secondary currents, the combination of a number of sets of insulated conductors laid parallel with the primary, the conductors of each individual set being connected in multiple arc, and the several sets being connected the one with the other, either in multiple arc or in series, substantially as hereinbefore described.

4. In an induction-coil, a cable made of a flat conductor for the primary current, surrounded by a number of wires or strips for the secondary currents, substantially as hereinbefore described.

5. In an induction-coil, a cable made of a conductor for the primary current, surrounded by a series of smaller wires or strips for the secondary current, the said wires or strips being separated by threads, strips, or layers of insulating material, and the said smaller wires or strips and separating threads, strips, or layers being connected together by insulating threads or material, substantially as hereinbefore described.

In testimony whereof we have signed our names to this specification in the presence of subscribing witnesses.

LUCIEN GAULARD.
JOHN DIXON GIBBS.

Witnesses:
WILLIAM DEARLE,
WILLIAM JAMES COSTIN,
*Both of 47 Lincoln's Inn Fields, London.*